United States Patent

[11] 3,568,638

| [72] | Inventor | George L. Isaac<br>West Peabody, Mass. |
|---|---|---|
| [21] | Appl. No. | 801,281 |
| [22] | Filed | Feb. 24, 1969 |
| [45] | Patented | Mar. 9, 1971 |
| [73] | Assignee | The B. F. Goodrich Company<br>New York, N.Y. |

[54] APPARATUS FOR APPLYING ADHESIVE TO SHOE SOLES
5 Claims, 3 Drawing Figs.

[52] U.S. Cl. ................................................ 118/323, 118/326
[51] Int. Cl. ................................................ B05c 5/00, B05c 11/16
[50] Field of Search ........................................ 134/181, 177; 118/323, 321, 326

[56] References Cited
UNITED STATES PATENTS

| 1,181,835 | 5/1916 | Burkhart | 118/323x |
| 2,877,589 | 3/1959 | Lanner | (118/326UX) |
| 2,888,903 | 6/1959 | Faber | 118/323X |
| 3,367,154 | 2/1968 | Wyatt et al. | 118/323X |
| 3,460,548 | 8/1969 | Giovagnoli | 134/181X |

Primary Examiner—John P. McIntosh
Attorneys—Joseph Januszkiewicz and James R. Lindsay ABSTRACT: A spray apparatus which applies liquid adhesive onto a molded outsole by a pair of spaced rotating nozzles that are supported on a common reciprocable carriage. The carriage reciprocates to a position over the outsole as the nozzle rotates to spray the adhesive to the upper surface and the sides of the outsole.

PATENTED MAR 9 1971

INVENTOR.
GEORGE L. ISAAC
BY Joseph Januszkiewicz
ATTY.

INVENTOR.
GEORGE L. ISAAC

APPARATUS FOR APPLYING ADHESIVE TO SHOE SOLES

This invention relates to an apparatus used in the manufacture of footwear and more particularly to an apparatus for spraying liquid adhesive onto molded footwear outsoles preparatory to assembling the outsole with a shoe upper and a foxing strip.

In the manufacture of fabric-upper footwear, a rubber or plastic outsole customarily is adhered to the fabric upper. A liquid adhesive is then applied to the upper surface and the peripheral side surface of the molded outsole as well as the lower portion of the fabric upper, after which a foxing strip is applied over the bottom margin of the fabric upper and over the sides of the molded outsole.

An important manufacturing step in assembling fabric-upper footwear is the application of the adhesive to the molded outsole. A poor technique and lack of proper care in applying the adhesive to the outsole will inadvertently yield footwear of inadequate strength and poor durability. Many attempts have been made to satisfy this important manufacturing operation; however, such prior attempts have not been entirely satisfactory The liquid adhesive heretofore has been applied manually by brush application or by roller application. The manual operation of brushing or rolling the adhesive onto the outsole is tedious and time consuming. Unsatisfactory adhesive application frequently is encountered by such application since the application is dependent, necessarily, on the skill of the operator applying the adhesive. Unsatisfactory applications often are experienced when the operator becomes fatigued. A further disadvantage resulting from the manual application of adhesive is the uneconomical manufacturing procedure created by hand operations, since such adhesive application method requires an unreasonable amount of manufacturing time to perform.

A further disadvantage to mechanically rolling or brushing adhesive onto the molded outsole is the inability of either method to adjust conveniently to various sizes and shapes of molded outsoles. Problems arise out of brush application and roller application when molded outsoles have inserts therein such as shanks, heel inserts, "live rubber," and the like. Delays are encountered when different sizes or shapes of outsoles are introduced into the manufacturing assembly line as there must be changes in adhesive applicators. The problem of displacing the heel inserts is encountered when using a roller or brush. Also, the rubber or plastic composition material from which the outsoles are molded often has handicapped the use of brushing and rolling methods for applying adhesives thereto, since the solvents used in certain adhesives tend to objectionably soften the synthetic rubber or plastic outsole causing a drag on application rollers and brushes, thereby degrading the surface of the molded outsole.

These above disadvantages heretofore experienced with prior apparatus are overcome by utilizing the apparatus of this invention which eliminates operator fatigue and a manufacturing operation dependent upon operator's skill thereby providing a finished footwear product that is of a consistent high quality. The adhesive spray application enables a rapid and uniform application of liquid adhesives to molded outsoles thereby substantially increasing the manufacturing speed with which adhesive is applied to outsoles to enable such apparatus to be incorporated into a semiautomatic inline footwear manufacturing assembly line which results in substantially increased production. The advantages of the invention are lower production costs, lower labor costs, and a consistently high-quality footwear product.

Further advantages are realized by spray adhesive application in that various shapes and sizes of molded outsoles may be processed through the same adhesive applicator without necessitating any equipment modification since the spray application is not restricted by sizes of the outsole and is not restricted by odd-shaped inserts incorporated into the outsole. A further advantage of the invention is that solvent release of the adhesive solvent is enhanced due to spray atomization which facilitates solvent vaporization. Solvent entrapment within the adhesive glue line is minimized, and detrimental wet spots are thereby eliminated. When utilizing a spray applicator, the molded outsole is not contacted by the applicator, thus eliminating the applicator drag encountered with brushing and rolling adhesive onto the outsole.

SUMMARY OF INVENTION

The present invention provides an apparatus which rapidly and economically sprays liquid adhesive onto molded outsoles by a pair of spaced spray nozzles which are supported by a pair of rotating outstretched arms centrally attached to a rotating spindle which spindle is attached to a movable carriage member which moves into a position which encompasses the stationary outsole and thence moves to a position which facilitates the unloading and loading of the molded outsole.

To clearly illustrate this invention, reference will henceforth be made to the embodiment of this invention shown in the drawings. The embodiment, however, is merely illustrative of the invention and is not intended to limit the scope of this invention to the recited embodiments.

DESCRIPTION OF THE PREFERRED EMBODIMENT

Figure 1:
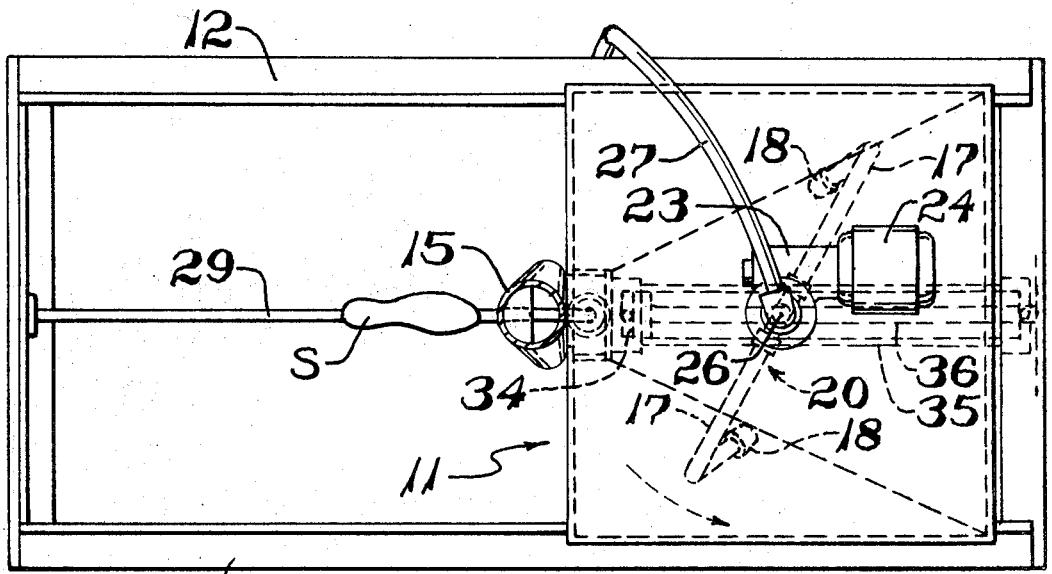
FIG. 1 is a plan view of apparatus of a preferred embodiment of the invention.

Referring to the drawings, wherein like reference characters designate like or corresponding parts throughout the several views, there is shown a support frame 10 and a movable member or spray hood 11. Frame 10 has a pair of longitudinally extending channels 12, 12 attached to the upper end portion thereof to provide raceways 13–13 for a plurality of rollers 14–14 of spray hood 11 which permit the reciprocation of the spray hood 11 on the support frame 10.

The spray hood or movable member 11 is a boxlike structure having rollers 14 attached to the respective corners thereof. A generally vertically extending flexible vent tube 15 is attached to one end of spray hood 11 and communicates with the interior thereof to provide means for venting undesirable solvent vapors from the work area in a manner clearly understood in the art.

Located within the spray hood 11 is a spray means assembly 20 which comprises a distribution T-fitting 16 to which is attached a pair of laterally outwardly extending tubular arms 17–17 with forwardly disposed arcuate portions which have attached to the outermost end portions thereof spray nozzles 18–18. The distribution T-fitting 16 and arms 17–17 are hollow and are interconnected with a vertically extending hollow drive shaft 22 which extends through spray hood 11 and connected for rotation to a transmission means 23 which is driven by a motor 24. Actuation of motor 24 rotates hollow drive shaft 22 and the spray nozzles 18–18 in a manner to be described. The upper end of the drive shaft 22 is journaled within a rotary coupling or spindle 25 which is connected to a fitting 26. Fitting 26 has connected thereto one end of a supply tube 27 through which liquid adhesive is pumped to the hollow interior of drive shaft 22. The other end of supply tube 27 is connected to a suitable pump 28 for advancing liquid adhesive under pressure to the spray nozzles 18–18.

The spray nozzles 18–18 which are attached to the distal ends of laterally extending tubular arms 17–17, projecting downward and inwardly such that the spray nozzles 18–18 are caused to revolve with the drive shaft 22 about the vertical axis of shaft 22 in a circular motion. The preferred alignment of the spray nozzles 18–18 is to direct the nozzles 18–18 slightly off center and to the right of the axis of rotation. (FIG. 1). The offset position compensates for wind resistance generated by rotating the spray means assembly 20 in a counterclockwise direction as viewed in FIG. 1 and permits adhesive to be sprayed toward the actual center of rotation of the drive shaft 22. It is understood that the offset position of the spray nozzles 18–18 would be reversed and to the left of the axis of rotation (FIG. 1) for a clockwise rotation of spray means 20.

A bracket 29 on the upper portion of frame 10 supports a stationary platen 30 on which is placed a molded outsole S. Suitably mounted on the upper portion of frame 10 below stationary platen 28 is a trough 31 which collects the adhesive overspray and returns the adhesive by gravity feed via tube 32 to a reservoir feed tank 33. The pump 28 supplies adhesive from tank 33 to the spray means assembly 20 as hereinbefore described.

Longitudinal reciprocal movement of the spray hood or movable member 11 is actuated and controlled by a piston 34 and cylinder 35 mechanism, whereby the spray hood 11 is caused to travel linearly along the channel tracks 12. The piston 34 has its piston rod 36 (FIG. 2) suitably attached to the frame 10. The cylinder 35 is suitably attached to the spray hood 11 and is movable therewith. The source of pressurized air is initiated and controlled by a suitable timing device set for a predetermined operating cycle.

Figure 2:
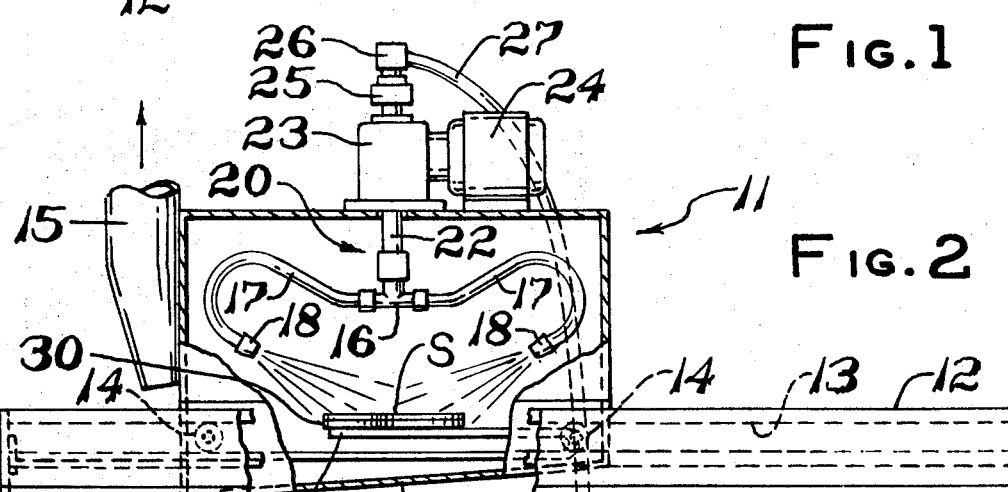
FIG. 2 is a side elevation view partly broken away, of the apparatus of FIG. 1.
Figure 3:
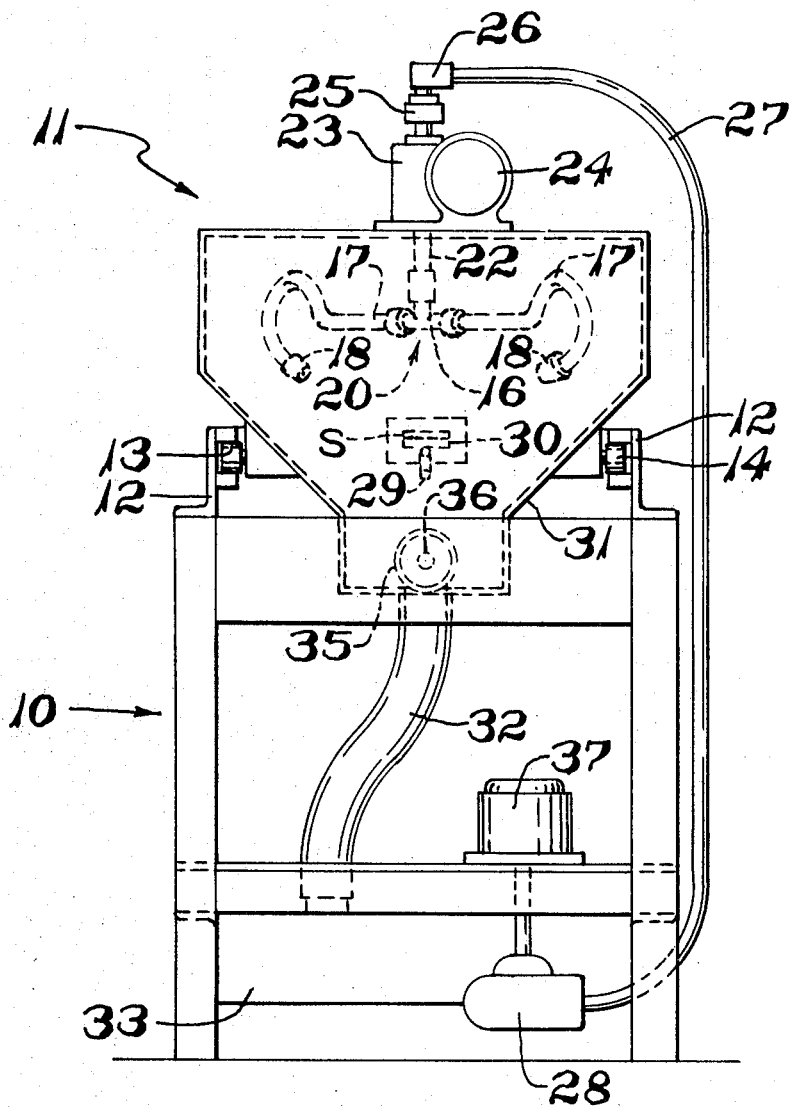
FIG. 3 is a rear elevation view of the apparatus.

To utilize the apparatus, a molded outsole to which adhesive is to be applied is placed on the platen. Movement of the spray hood 11 is actuated by the operator by directing pressurized air to the head end of cylinder 35 which moves the spray hood 11 in a leftward direction as viewed in FIG. 1 along the conveyor tracks 12 toward the stationary platen 30. Upon positioning of the spray hood 11 over the molded outsole S supported on the plate 30, the adhesive spray means assembly is actuated by energizing motor 37 which drives pump 28 which pumps a liquid adhesive via conduit 27 and tubular arms 17–17 to spray nozzles 18–18 which direct an adhesive spray towards the outsole workpiece (FIG. 2). Simultaneously with such action, motor 24 is energized which rotates spray means assembly 20. With the spray means assembly 20, having spray nozzles 18–18 projected downward and inwardly as hereinbefore described and having said spray nozzles 18–18 traveling in a circular pattern, the adhesive spray is directed toward the molded outsole workpiece in an even manner to fully cover the upper surface portion and the peripheral side portions of the outsole S. After the adhesive is sprayed for a predetermined time, motor 37 is deenergized so that the adhesive spray ceases. The spray hood 11 is then moved to the right from the position shown in FIG. 2 by directing pressurized air to the rod end of cylinder 35. After a liquid adhesive has been spray-applied to the molded outsole, excess over spray adhesive is accumulated in the collecting trough 31 located below the stationary plate 30 and thereafter transferred by gravity feed to a reservoir tank 33 for recycling.

The apparatus having rotatable spray nozzles hereinbefore described is capable of rapidly applying liquid adhesives uniformly on a molded outsole prior to assembling the outsole with other integral parts of conventional footwear products to thereby substantially increase commercial production.

Although a specific embodiment of a preferred method of operating the embodied apparatus has been hereinbefore described, it is understood that the subject invention is not limited to the recited example. All obvious variations and modifications of the recited example are contemplated and included within the spirit and scope of the invention as defined in the appended claims.

I claim:

1. An apparatus for spraying liquid adhesive onto an outsole, comprising: a support; a platen mounted on said support for supporting an outsole; a movable member mounted on said support; drive means on said support operatively connected to said movable member for reciprocating said movable member on said support between an operative position and an inoperative position; adhesive spray means rotatably mounted on said movable member for directing a liquid adhesive toward said platen in the operative position; motive means mounted on said movable member and operatively connected to said adhesive spray means for rotating said spray means about a vertically extending axis during the operative position; a liquid adhesive supply means; and pump means operatively interconnecting said liquid adhesive supply means and said spray means for pumping liquid adhesive from said supply means to said spray means for spraying an outsole located on said platen.

2. An apparatus for spraying liquid adhesive as set forth in claim 1 wherein said adhesive spray means comprises a rotating spindle connected to a pair of laterally extending tubular arms, spray nozzles mounted on the outermost end portion of said tubular arms thereof directed inwardly and downwardly of said rotating spindle.

3. The apparatus for spraying liquid adhesive as set forth in claim 2 wherein said rotating spindle has a central axis of rotation, and said spray nozzles are projected outwardly away from said axis of rotation so that said spray nozzle is projected on a horizontally disposed plane which is normal to said vertically extending axis so as to compensate for wind resistance created by counterclockwise rotation of said spray means.

4. An apparatus for spraying liquid adhesive onto the upper and peripheral surfaces of molded outsoles, comprising: a support; a platen mounted on said support for supporting said outsole; a movable member mounted on said support for movement from a first position to a second position; said movable member including a spray hood which encompasses said platen in said second position of said movable member; drive means on said support operatively connected to said movable member for moving said movable member between said first and said second positions; adhesive spray means rotatably mounted on said hood for directing a liquid adhesive toward said platen when said movable member is in the second position; motive means mounted on said hood and operatively connected to said adhesive spray means for rotating said spray means; a liquid adhesive supply means; and pump means operatively interconnecting said liquid adhesive supply means and said spray means for pumping liquid adhesive from said supply means to said spray means for spraying an outsole located on said platen.

5. The apparatus for spraying liquid adhesive as set forth in claim 4 wherein said hood has a flexible vent means operatively connected to said hood for venting volatile solvent vapors away from the work area enclosed by said hood.